(12) United States Patent
Mori et al.

(10) Patent No.: US 10,160,286 B2
(45) Date of Patent: Dec. 25, 2018

(54) STRUCTURE FOR ARRANGING HEAT-GENERATING ELECTRIC COMPONENT IN AUTOMOBILE

(71) Applicant: Nissan Motor Co., Ltd., Kanagawa (JP)

(72) Inventors: Nobuhiro Mori, Kanagawa (JP); Takuma Kobayashi, Kanagawa (JP); Minoru Kaho, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/781,798

(22) PCT Filed: Mar. 20, 2014

(86) PCT No.: PCT/JP2014/057745
§ 371 (c)(1),
(2) Date: Oct. 1, 2015

(87) PCT Pub. No.: WO2014/162892
PCT Pub. Date: Oct. 9, 2014

(65) Prior Publication Data
US 2016/0039263 A1    Feb. 11, 2016

(30) Foreign Application Priority Data
Apr. 5, 2013    (JP) ................. 2013-079353

(51) Int. Cl.
*F25D 23/12*    (2006.01)
*B60H 1/00*    (2006.01)
(Continued)

(52) U.S. Cl.
CPC ..... *B60H 1/00271* (2013.01); *B60H 1/00564* (2013.01); *B60H 1/143* (2013.01);
(Continued)

(58) Field of Classification Search
CPC ............... B60H 1/00271; B60H 1/143; B60H 1/00285; B60H 2001/00614;
(Continued)

(56) References Cited

U.S. PATENT DOCUMENTS

| | | | |
|---|---|---|---|
| 6,230,677 B1 * | 5/2001 | Setsuda .................. | B60R 16/04 123/184.21 |
| 6,902,020 B2 * | 6/2005 | Kronner .................. | B60R 16/04 180/68.5 |

(Continued)

FOREIGN PATENT DOCUMENTS

| | | |
|---|---|---|
| CN | 1621261 A | 6/2005 |
| CN | 102729919 A | 10/2012 |

(Continued)

OTHER PUBLICATIONS

Machine Translation of Miyamoto et al. Cooling Apparatus, Aug. 2, 2012; Espacenet, WO 2012/101795, all.*

(Continued)

*Primary Examiner* — Filip Zec
(74) *Attorney, Agent, or Firm* — Osha Liang LLP

(57) ABSTRACT

A structure for arranging a heat-generating electric component in an automobile has a heat-generating electric component, and a duct extending from an air conditioning unit. The heat-generating electric component and the duct are disposed between a seat and a floor surface of the automobile. An air outlet hole is formed in the heat-generating electric component, through which air on an inside of the heat-generating electric component is discharged to cool the inside. An exit of the duct is disposed near the air outlet hole of the heat-generating electric component.

15 Claims, 7 Drawing Sheets

(51) Int. Cl.
*B60H 1/14* (2006.01)
*B60K 11/06* (2006.01)

(52) U.S. Cl.
CPC ........ *B60K 11/06* (2013.01); *B60H 2001/003* (2013.01); *B60H 2001/00614* (2013.01)

(58) Field of Classification Search
CPC . B60H 1/00564; B60K 11/06; B60L 11/1874; F01P 1/00; H01M 10/613; H01M 10/6563; H05K 7/20909
See application file for complete search history.

(56) References Cited

U.S. PATENT DOCUMENTS

| | | | | |
|---|---|---|---|---|
| 7,051,825 B2* | 5/2006 | Masui | ...................... | B60K 1/04 180/65.1 |
| 7,079,379 B2 | 7/2006 | Yamaguchi et al. | | |
| 7,396,075 B2* | 7/2008 | Ohkuma | .................. | B60K 1/04 296/65.05 |
| 8,127,876 B2* | 3/2012 | Phillips | .................. | A01D 69/02 180/68.2 |
| 8,455,133 B2* | 6/2013 | Anantharaman | ....... | H01M 6/42 429/148 |
| 8,567,543 B2* | 10/2013 | Kubota | ................... | B60K 1/04 180/65.21 |
| 8,717,761 B2* | 5/2014 | Aoki | ........................ | B60K 1/04 165/104.33 |
| 8,720,625 B2* | 5/2014 | Yamamoto | ......... | B60H 1/00271 180/68.1 |
| 8,950,467 B2* | 2/2015 | Lee | .................... | B60H 1/00285 165/203 |
| 9,186,957 B2 | 11/2015 | Yoshida | | |
| 2005/0111167 A1 | 5/2005 | Yamaguchi et al. | | |
| 2012/0090905 A1* | 4/2012 | Vollmer | ............. | B60H 1/00392 180/65.1 |
| 2012/0227431 A1* | 9/2012 | Wang | ................. | B60H 1/00921 62/238.7 |
| 2012/0248867 A1 | 10/2012 | Yoshida | | |
| 2012/0286541 A1* | 11/2012 | Kashiwagi | .......... | B60L 11/1816 296/193.07 |
| 2013/0139997 A1* | 6/2013 | Murakami | ............. | B60K 11/06 165/41 |

FOREIGN PATENT DOCUMENTS

| | | | |
|---|---|---|---|
| EP | 1538885 A2 | 6/2005 | |
| JP | S56-71411 U | 6/1981 | |
| JP | H01-160755 A1 | 6/1989 | |
| JP | 2005306239 A | 11/2005 | |
| JP | 2011-220014 A | 11/2011 | |
| WO | WO 2011023875 A1 * | 3/2011 | ............... B60K 1/04 |
| WO | 2012/101795 A1 | 8/2012 | |

OTHER PUBLICATIONS

International Preliminary Report on Patentability and Written Opinion issued in corresponding PCT Application No. PCT/JP2014/057745, dated Oct. 6, 2014 (11 pages).

* cited by examiner

STRUCTURE FOR ARRANGING HEAT-GENERATING ELECTRIC COMPONENT IN AUTOMOBILE

CROSS-REFERENCE TO RELATED APPLICATIONS

The present application is a national stage application of PCT/JP2014/057745, filed Mar. 20, 2014, and claims priority from Japanese Patent Application No. 2013-079353, filed on Apr. 5, 2013, the contents of which is incorporated herein in its entirety.

BACKGROUND

Technical Field

The present invention relates to a structure for arranging a heat-generating electric component in an automobile.

Related Art

Heretofore, vehicle body structures have been known in which an inverter configured to convert a battery's direct current into alternating current is provided on a floor surface at a position under an instrument panel (see Japanese Patent Application Publication No. Hei 1-160755, for example). Here, some power converters such as the inverter generate heat when power is applied thereto, and therefore have a function of cooling the inside thereof via air cooling. Note that the air cooling is a method of cooling the power converter by taking ambient air into the power converter to thereby cause the inside thereof and the air to exchange heart with each other, and then discharging the warmed air to the outside.

SUMMARY

In a cabin, narrow spaces such as under seats are spots where heat is likely to stay. Then, if the heat-generating electric component is arranged under a seat or a similar spot, heat may possibly stay there, thus lowering the efficiency of cooling the heat-generating electric component.

A structure for arranging a heat-generating electric component in an automobile according to one or more embodiments of the present invention is capable of maintaining the efficiency of cooling the heat-generating electric component high even if the heat-generating electric component is disposed under a seat.

In a structure for arranging a heat-generating electric component in an automobile according to one or more embodiments of the present invention, a heat-generating electric component and a duct for air conditioning are disposed under a seat, and an exit of the duct is disposed near an air outlet hole formed in the heat-generating electric component.

DETAILED DESCRIPTION

Figure 1:
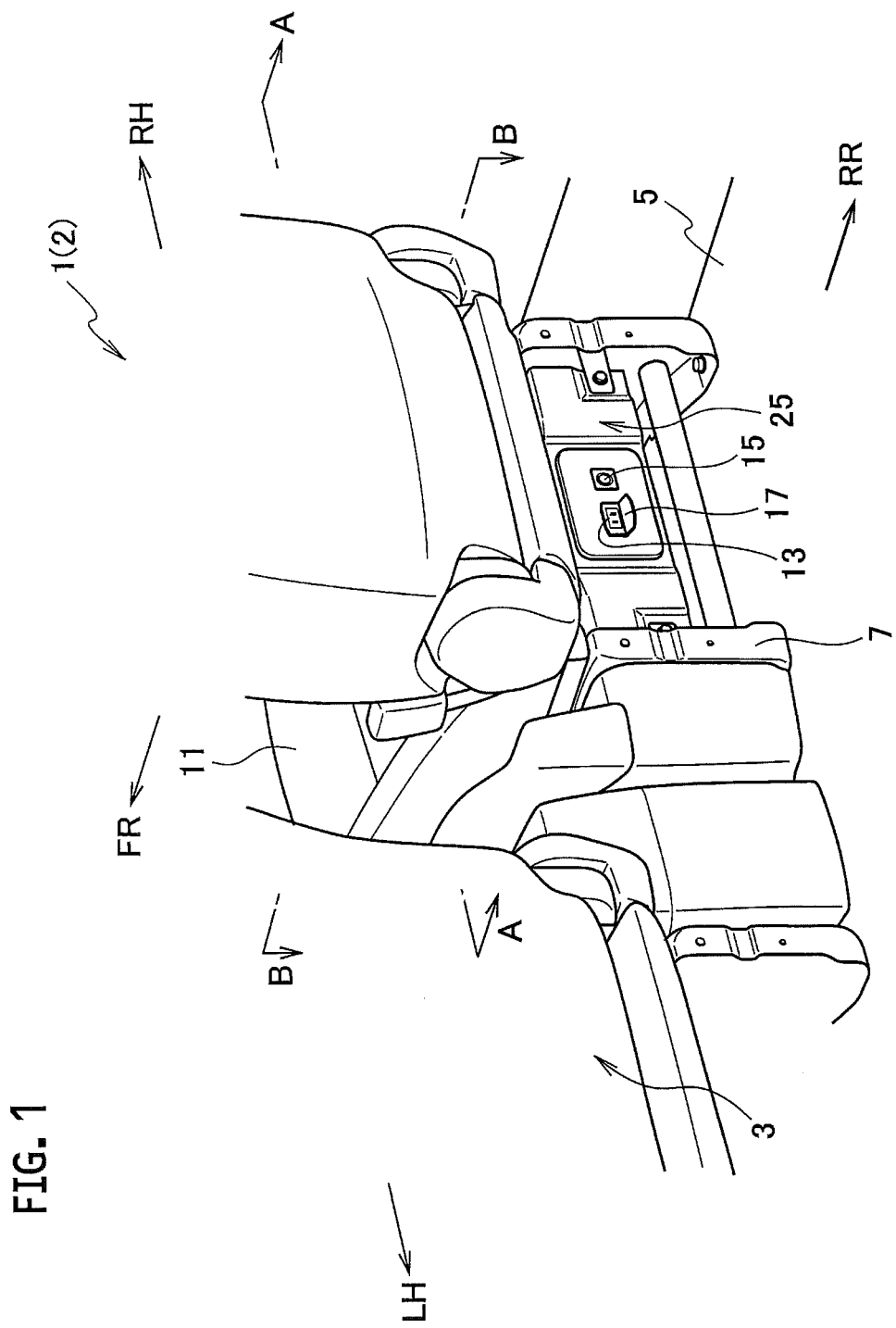
FIG. 1 is a perspective view of the back side of the seat of a front seat assembly according to one or more embodiments of the present invention as seen diagonally from the rear side.

Embodiments of the present invention will now be described in detail with the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that FR, RR, UPR, LWR, RH, and LH in the drawings represent the front side, rear side, upper side, lower side, right side, and left side of a vehicle, respectively.

As shown in FIG. 1, front seat assemblies inside a cabin are formed by a driver seat assembly 1 disposed on the right side and a passenger seat assembly 3 disposed on the left side. An attachment member 7 provided with a heat-generating electric component 9 therein is arranged on the upper side of a floor surface 5. A seat cushion 11 as a constituent component of a seat 2 of the driver seat assembly 1 is arranged above this attachment member 7. Also, an interior power socket 13 and earth 15 are disposed at a center portion, in the widthwise direction, of a protector 25 covering the rear side of the attachment member 7. A cover 17, which is openable and closable, is attached to the interior power socket 13. At the time of using the interior power socket 13, the cover 17 is opened downward to expose the interior power socket 13. Thus, the interior power socket 13 is disposed on the rear side (back side) of a space under the front seat 2.

Figure 2:
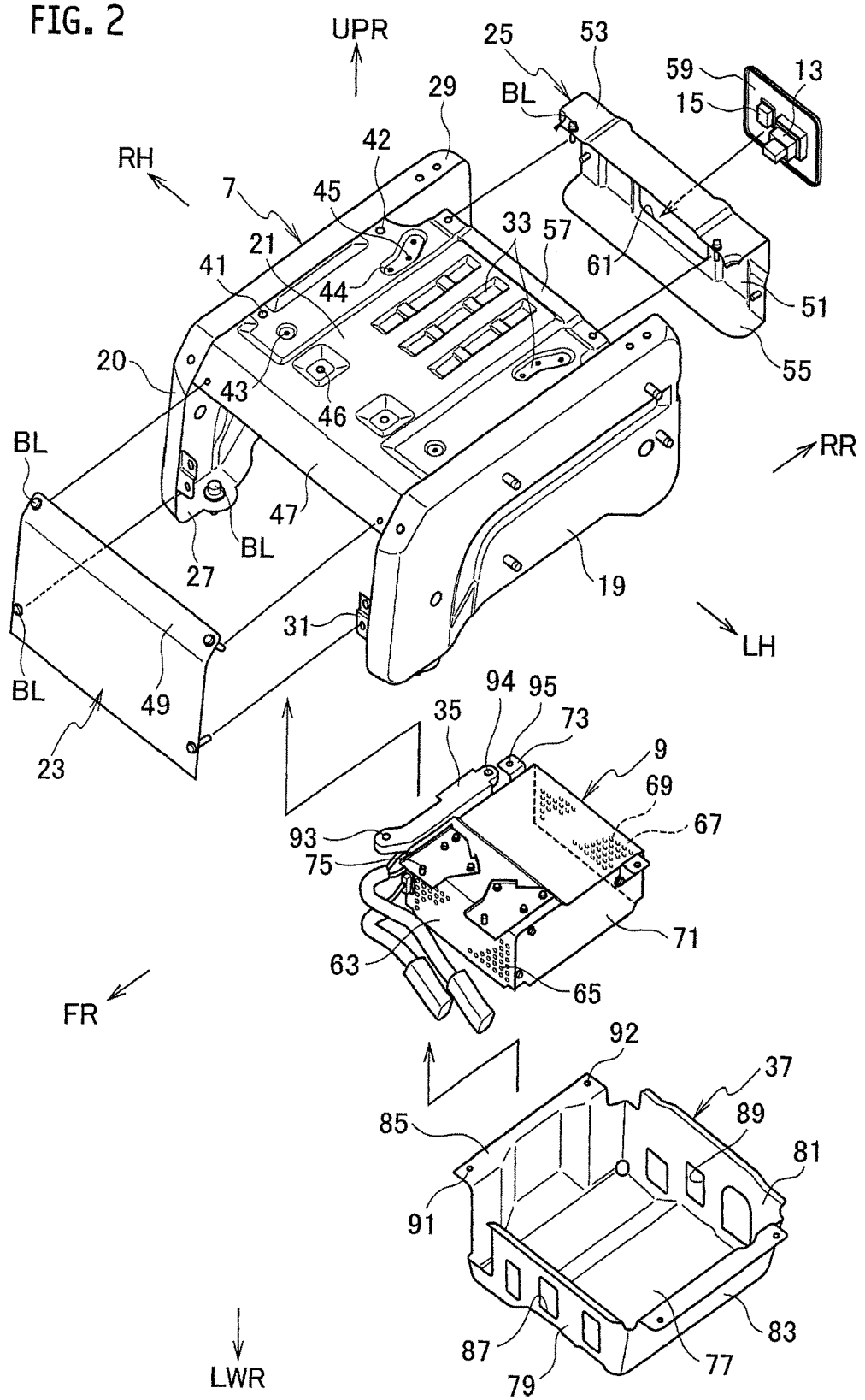
FIG. 2 is an exploded perspective view showing an attachment member, a heat-generating electric component, a junction box, and a housing according to one or more embodiments of the present invention.

As shown in FIG. 2, the attachment member 7 according to one or more embodiments of the present invention includes: a pair of, or two (multiple), left and right vertical walls 19 standing upward from the floor surface 5 (see FIG. 1) of the automobile and separated from each other by a predetermined distance in the vehicle widthwise direction; an upper wall 21 coupling upper portions of the pair of vertical walls 19 to each other; a front cover 23 covering an opening defined by front portions of the vertical walls 19 and the upper wall 21; and the protector 25 covering an opening defined by rear portions of the vertical walls 19 and the upper wall 21.

Each vertical wall 19 extends in the vehicle front-rear direction. At the lower end of the vertical wall 19, a lower flange 27 is formed which is bent and extends inward in the widthwise direction, and the lower flange 27 is fastened to the floor surface 5 of the vehicle with bolts BL. Moreover, at the upper end of the vertical wall 19, an upper flange 29 is formed which is bent and extends inward in the widthwise direction, and the opposite ends of the upper wall 21 in the widthwise direction are joined to the upper flanges 29 of the vertical walls 19. Thus, the upper ends of the pair of left and right vertical walls 19 are coupled by the upper wall 21, which extends in the vehicle widthwise direction. In addition, at a lower portion of a front end 20 of each vertical wall 19, a tongue piece 31 is provided which extends inward in the widthwise direction.

The upper wall 21 is formed to be rigid by multiple embossed portions 33 recessed downward and is provided with multiple attachment holes for attaching the heat-generating electric component 9, a junction box 35, and a housing 37 to the upper wall 21, as will be described later. These attachment holes are designated as a first attachment hole 41, a second attachment hole 42, a third attachment hole 43, a fourth attachment hole 44, a fifth attachment hole 45, and a sixth attachment hole 46 in this order from the right to the left in the vehicle widthwise direction. The third to sixth attachment holes are bored at the bottom surfaces of some of the embossed portions 33. Note that a front edge portion 47 of the upper wall 21 is bent and extends diagonally downward toward the front side of the vehicle.

Moreover, the front cover 23 is bent and extends diagonally upward at its upper end portion 49 and is fastened to the front edge portion 47 of the upper wall 21 and the tongue pieces 31 of the vertical walls 19 with bolts BL.

Also, the protector 25 is formed in an angular U-shape in a side view and is formed by: a vertical surface 51 disposed as a center portion in the vertical direction; an upper flange 53 bent and extending forward from the upper end of the vertical surface 51; and an extension portion 55 bent and extending forward from the lower end of the vertical surface 51. The protector 25 is fixed to the upper wall 21 by fastening the upper flange 53 of the protector 25 to a rear edge portion 57 of the upper wall 21 with bolts BL. In addition, the interior power socket 13 and the earth 15 are provided on a rectangular power socket cover 59. Here, a rectangular opening 61 is formed in the center of the vertical surface 51 of the protector 25, and the power socket cover 59 is mounted to the protector 25 in such a way as to close this opening 61.

Meanwhile, the heat-generating electric component 9, the junction box 35, and the housing 37 are attached to the lower side of the upper wall 21 of the attachment member 7.

The heat-generating electric component 9 is designated particularly as an inverter and a voltage converter in one or more embodiments of the present invention. However, the heat-generating electric component 9 may be only an inverter or other various types of electric components that generate heat when power is applied thereto. Multiple round air inlet holes 65 are bored in a front surface 63 of the heat-generating electric component 9 while multiple round air outlet holes 69 are formed in a rear surface 67 of the heat-generating electric component 9, the air outlet holes 69 communicating with the inside of the heat-generating electric component 9. An attachment bracket 73 is provided at the rear upper end of each side portion 71 of the heat-generating electric component 9 while a pair of left and right upwardly protruding screws 75 are provided at the front end of the heat-generating electric component 9. The junction box 35 is disposed on the right side of the vehicle relative to the heat-generating electric component 9. The housing 37 is formed in a lid shape open at the top and is formed by a bottom surface 77, a front surface 79, a rear surface 81, and side surfaces 83. Moreover, at the upper end of each side surface 83, an attachment flange 85 is formed which is bent and extends outward in the widthwise direction, and the housing 37 is fixed to the attachment member 7 by fastening the attachment flange 85 to the lower side of the upper wall 21 with bolts BL. The housing 37 surrounds these heat-generating electric component 9 and junction box 35 in such a way as to cover them from below. Meanwhile, rectangular air inlet holes 87 are bored in the front surface 79 of the housing 37, and rectangular air outlet holes 89 are formed in the rear surface 81 of the housing 37. Also, current converted by the heat-generating electric component 9 can be taken out inside the cabin through the interior power socket 13.

Description will now be given of spots where the heat-generating electric component 9, the junction box 35, and the housing 37 are fixed to the attachment member 7.

A fifth insertion hole 95 formed in each attachment bracket 73 of the heat-generating electric component 9 is disposed to coincide with the corresponding fifth attachment hole 45 in the upper wall 21 of the attachment member 7. Moreover, each screw 75 at the front end of the heat-generating electric component 9 is disposed to coincide with the corresponding sixth attachment hole 46 in the upper wall 21. Via fastening with the bolts BL and the screws 75 in this state, the heat-generating electric component 9 is fixed to the upper wall 21 of the attachment member 7. As a result, the heat-generating electric component 9 is disposed away from the floor surface 5 in the vertical direction.

Also, a third insertion hole 93 in the junction box 35 is disposed to coincide with the third attachment hole 43 in the upper wall 21 of the attachment member 7. Moreover, a fourth insertion hole 94 in the junction box 35 is disposed to coincide with the fourth attachment hole 44 in the upper wall 21. By inserting and fastening bolts in the attachment holes and the insertion holes in this state, the junction box 35 is fixed to the upper wall 21 of the attachment member 7.

A first insertion hole 91 in each attachment flange 85 of the housing 37 is disposed to coincide with the corresponding first attachment hole 41 in the upper wall 21 of the attachment member 7. Moreover, a second insertion hole 92 in each attachment flange 85 of the housing 37 is disposed to coincide with the corresponding second attachment hole 42 in the upper wall 21. By inserting and fastening bolts in the attachment holes and the insertion holes in this state, the housing 37 is fixed to the upper wall 21 of the attachment member 7.

To summarize the above, in the procedure of assembling the attachment member 7 according to one or more embodiments of the present invention, firstly, the vertical walls 19 are joined to the upper wall 21 by welding or the like, and the heat-generating electric component 9 and the junction box 35 are then fixed to the lower side of the upper wall 21. Thereafter, the housing 37 is attached to the upper wall 21 in such a way as to cover the heat-generating electric component 9 and the junction box 35, and the lower flanges 27 of the vertical walls 19 are then fastened to the floor surface 5. Lastly, the front cover 23 and the protector 25 are fixed to the vertical walls 19 and the upper wall 21.

Figure 3:
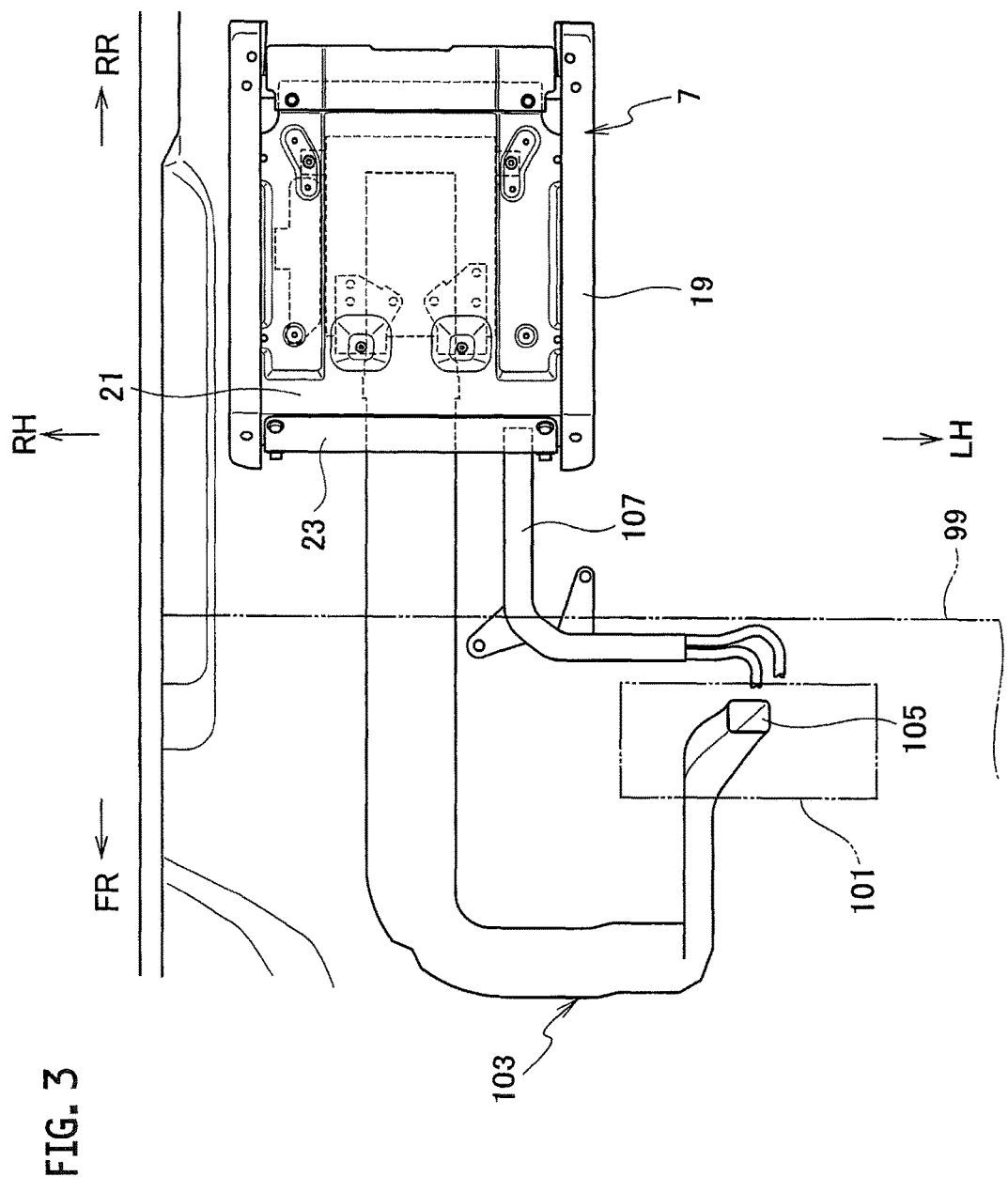
FIG. 3 is a plan view showing the attachment member and a heater duct according to one or more embodiments of the present invention.

As shown in FIG. 3, an instrument panel 99 is arranged along the vehicle widthwise direction at a front section of the cabin, and an air conditioning unit 101 is arranged behind the instrument panel 99. An end portion 105 of a heater duct 103 (duct) is connected to this air conditioning unit 101. Behind the instrument panel 99, the heater duct 103 extends downwardly from the air conditioning unit 101 and is then bent toward the right side of the vehicle and extends in the vehicle widthwise direction. The heater duct 103 is thereafter bent toward the rear side of the vehicle and extends out of the instrument panel 99 and then to a lower portion of the attachment member 7 on the right side of the vehicle. The heater duct 103 is a duct of a hollow shape through which temperature adjustment air that is warm flows. Note that a harness 107 extending from the attachment member 7 is connected to the air conditioning unit 101.

Figure 4:
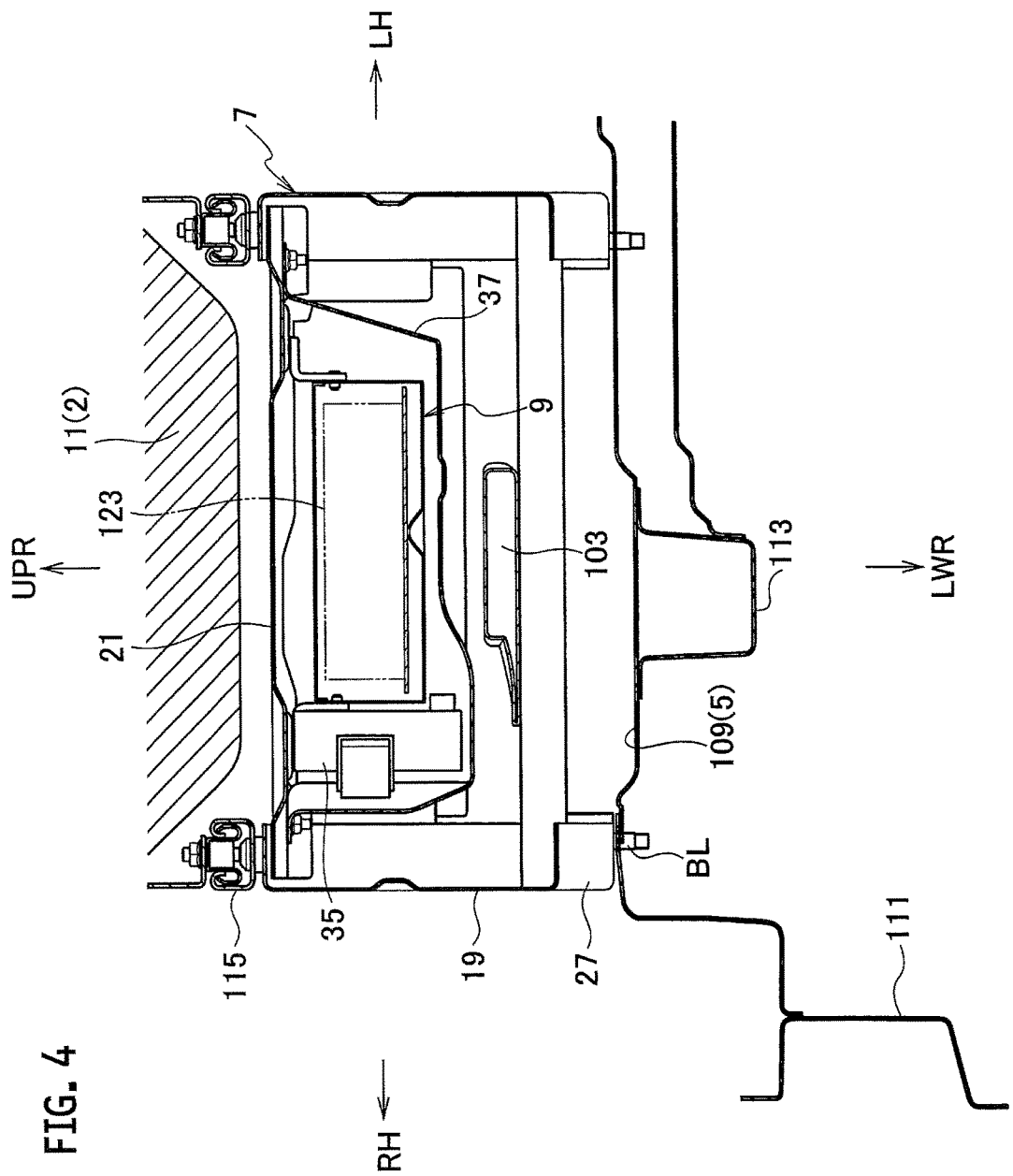
FIG. 4 is a cross-sectional view taken along line A-A in FIG. 1.

As shown in FIG. 4, a side sill 111 extending in the vehicle front-rear direction is provided on a lateral side of a floor panel 109 (floor surface 5). A member 113 extending in the vehicle front-rear direction is joined to the lower surface of a portion of the floor panel 109 which coincides with a center portion of the seat cushion 11 in the vehicle widthwise direction. Moreover, the lower flanges 27 of the vertical walls 19 of the attachment member 7 are fastened to the floor panel 109 with the bolts BL, thereby fixing the attachment member 7 to the floor surface 5. Seat slide rails 115 are fixed to the tops of the vertical walls 19 of the attachment member 7. Thus, the attachment member 7 is arranged under the seat cushion 11, which is a constituent component of the seat 2 of the automobile. The seat slide rails 115 extend in the vehicle front-rear direction and the seat 2 is held slidably in the front-rear direction. Hence, the attachment member 7 remains fixed to the floor surface 5 even when the seat 2 is slid in the front-rear direction.

Figure 5:
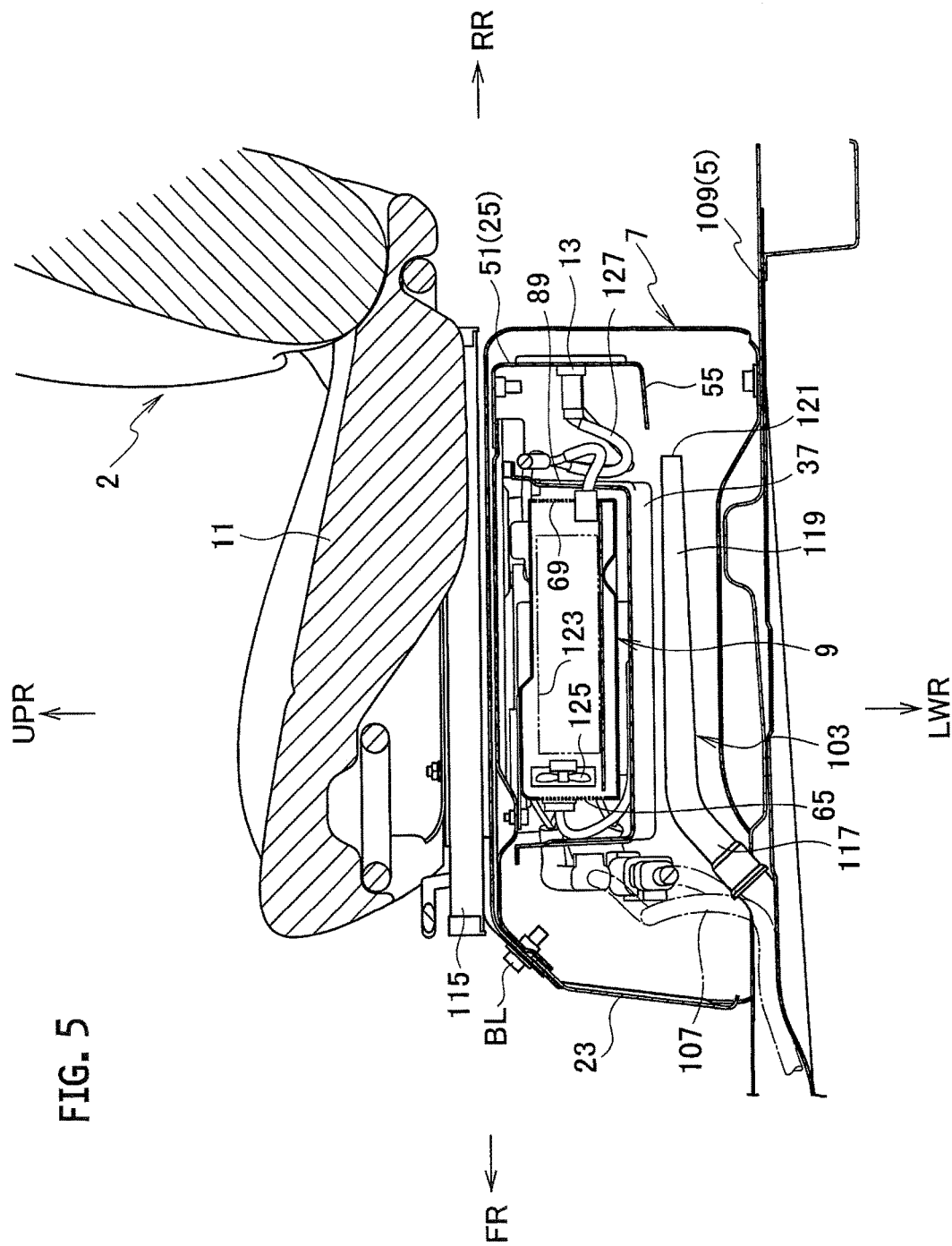
FIG. 5 is a cross-sectional view taken along line B-B in FIG. 1.
Figure 6:
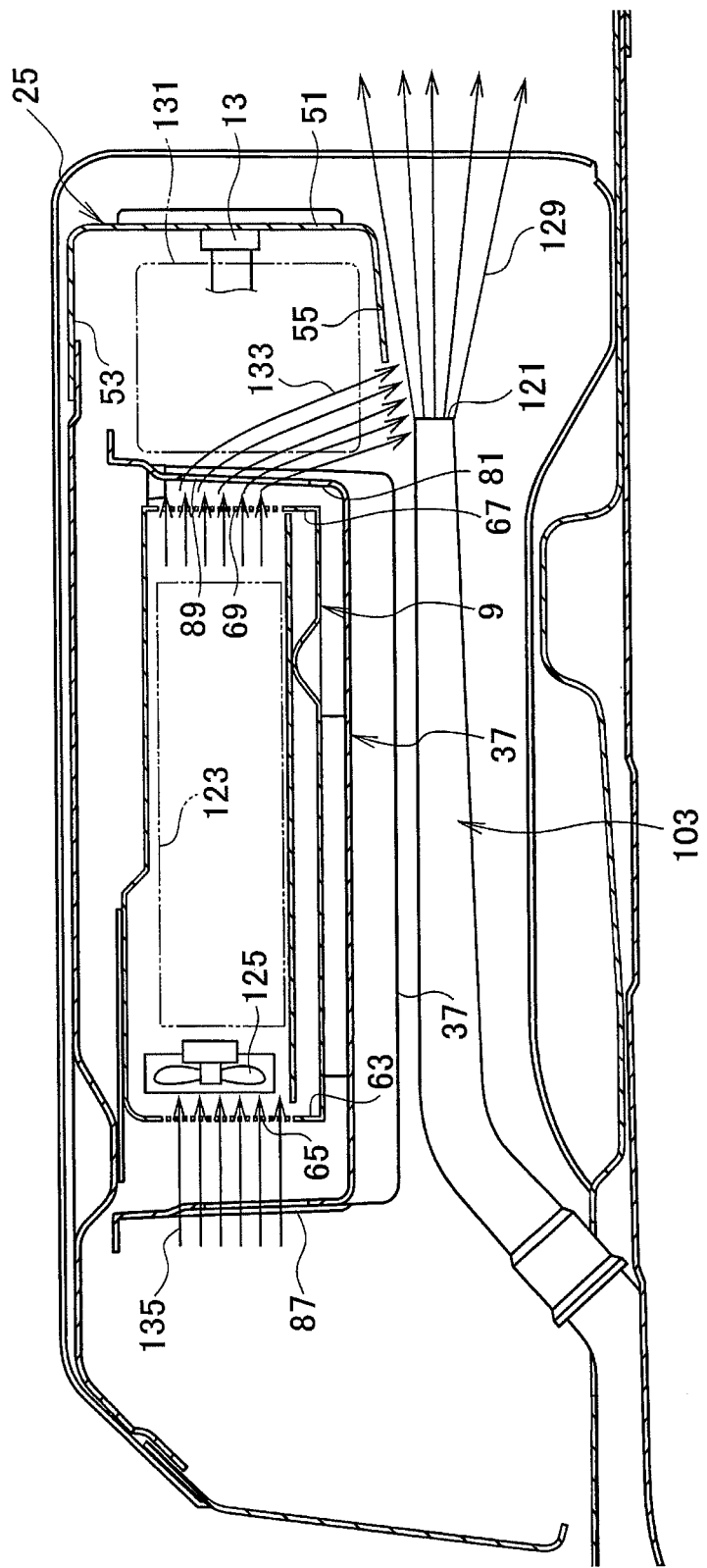
FIG. 6 is an enlarged cross-sectional view of a main section in FIG. 5 and shows the flow of discharged air.

As shown in FIGS. 5 and 6, the heat-generating electric component 9 and the heater duct 103 (duct) are arranged between the seat cushion 11 of the seat 2 and the floor surface 5. Specifically, the attachment member 7 is fixed on the floor surface 5, and the seat 2 is arranged above the attachment member 7. Inside the attachment member 7, there are the heater duct 103 which is disposed above the floor surface 5 and the heat-generating electric component 9 which is disposed above the heater duct 103. A rear section of the heater duct 103 includes: a bent portion 117 bent near the front end of the housing 37 and extending diagonally upward toward the rear side; and a rear end portion 119 extending from the rear end of the bent portion 117 toward the rear side of the vehicle along the floor surface 5 (substantially in parallel with the floor surface 5). Also, the tip of the rear end portion 119 is formed as an exit 121 for temperature adjustment air 129.

Here, since a main part 123 inside the heat-generating electric component 9 generates heat when power is applied thereto, a cooling mechanism configured to cool the main part 123 is provided. This cooling mechanism is formed by the air inlet holes 65 in the front surface 63 of the heat-generating electric component 9, an air intake fan 125 inside the heat-generating electric component 9, and the air outlet holes 69 in the rear surface 67 of the heat-generating electric component 9. Thus, by rotating the air intake fan 125, ambient air is taken in from the air inlet holes 65 in the front surface 63 and is caused to exchange heat with the main part 123 inside the heat-generating electric component 9. The air heated by the heat exchange is then discharged from the air outlet holes 69 in the rear surface 67. As a result, the main part 123 of the heat-generating electric component 9 is cooled.

Meanwhile, the air outlet holes 69, through which the air on the inside of the heat-generating electric component 9 is discharged to cool the inside, are formed in the rear surface 67 of the heat-generating electric component 9, and also the air outlet holes 89, through which the air on the inside of the housing 37 is discharged outward to cool the inside of the housing 37, are formed in the rear surface 81 of the housing 37 as well. The air outlet holes 89 of the housing 37 are disposed rearward of the air outlet holes 69 of the heat-generating electric component 9, and the exit 121 of the heater duct 103 is disposed rearward of the air outlet holes 89 of the housing 37. Note that the exit 121 of the heater duct 103 is disposed near the air outlet holes 69 of the heat-generating electric component 9 and the air outlet holes 89 of the housing 37. In addition, the air intake fan 125 is arranged inside the heat-generating electric component 9 in front of the main part 123. Also, the protector 25 is disposed to face the rear side of the heat-generating electric component 9. The extension portion 55 of this protector 25 extends diagonally forward toward the exit 121 of the heater duct 103. In other words, the extension portion 55 of the protector 25 is inclined to extend slightly downward toward the front side from the lower end of the vertical surface 51 of the protector 25. Moreover, the interior power socket 13, which is attached to the protector 25, is connected to the heat-generating electric component 9 by a harness 127.

Using FIG. 6, description will now be given of the flow of cooling air flowing through the heat-generating electric component 9 and the flow of the temperature adjustment air 129 discharged from the exit 121 of the heater duct 103.

Since the main part 123 arranged inside the heat-generating electric component 9 generates heat when power is applied thereto, it needs to be cooled with cooling air.

When the air intake fan 125 of the heat-generating electric component 9 is actuated, ambient air 135 is taken into the heat-generating electric component 9 from the air inlet holes 87 of the housing 37 through the air inlet holes 65 of the heat-generating electric component 9. The air 135 then flows toward the rear side of the vehicle, thereby cooling the main part 123. The air 135 is then discharged to the rear side of the housing 37 from the air outlet holes 69 of the heat-generating electric component 9 through the air outlet holes 89 of the housing 37.

On the other hand, the temperature adjustment air 129 is blowing rearward out of the exit 121 of the heater duct 103. For this reason, an exit-side space 131 surrounded by the rear surface 81 of the housing 37 and the upper flange 53, the vertical surface 51, and the extension portion 55 of the protector 25 is at negative pressure lower than the atmospheric pressure.

Hence, discharged air 133 discharged from the air outlet holes 89 of the housing 37 flows downward through the exit-side space 131, which is at the negative pressure, is drawn to the exit 121 of the heater duct 103, and blown rearward along with the temperature adjustment air 129 from the exit 121.

Note that the interior power socket 13 is disposed rearward of and around the air outlet holes 69 of the heat-generating electric component 9, and the exit 121 of the heater duct 103 is disposed below the air outlet holes 69 of the heat-generating electric component 9.

Using FIG. 7, description will now be given of how the attachment member 7 is deformed in a side collision of the vehicle.

As mentioned above, the lower ends of the vertical walls 19 of the attachment member 7 are fixed to the floor surface 5.

Figure 7:
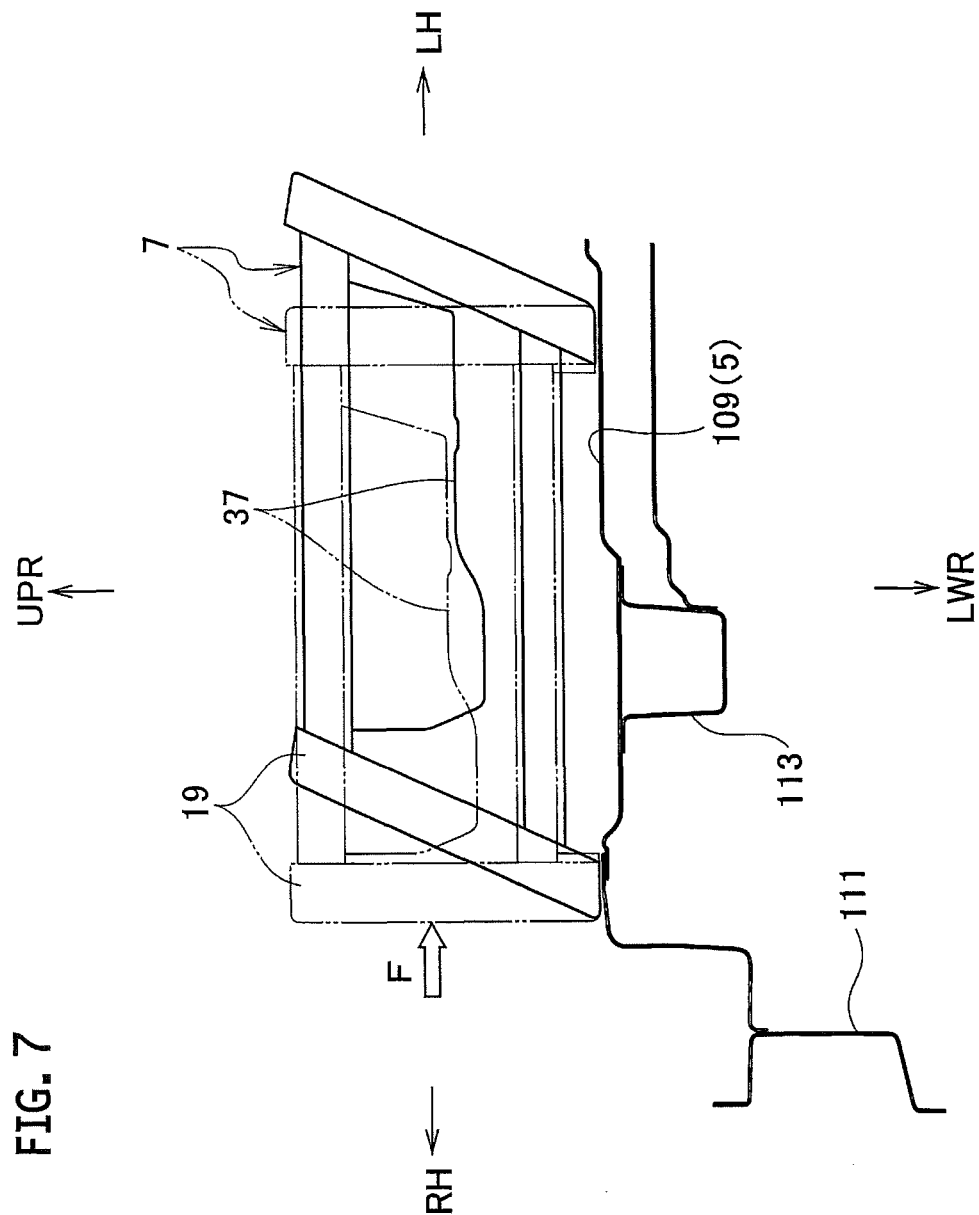
FIG. 7 is a schematic view showing how the attachment member is deformed when a side collision load is inputted into a lateral side of the vehicle body.

Thus, as shown in FIG. 7, when a side collision load F is inputted into the attachment member 7 from the right side of the vehicle, the vertical walls 19 are deformed such that the upper ends are moved toward the left side of the vehicle, which is the inner side in the vehicle widthwise direction, with the lower ends remaining fixed to the floor surface 5.

Specifically, as shown by two-dot chain lines, before the side collision load F is inputted, the attachment member 7 and the floor surface 5 define a horizontally long rectangular shape. On the other hand, as shown by solid lines, when the side collision load is inputted, both left and right vertical walls 19, 19 are deformed in such a way as to fall toward the left side of the vehicle about their lower ends. Hence, the attachment member 7 and the floor surface 5 define a parallelogram shape after the deformation.

(1) In the structure for arranging the heat-generating electric component 9 in an automobile according to one or more embodiments of the present invention, the heat-generating electric component 9 and the heater duct 103 (duct), which extends from the air conditioning unit 101, are disposed between the seat 2 and the floor surface 5 of the automobile. In the heat-generating electric component 9, the air outlet holes 69 are formed, through which the air on the inside of the heat-generating electric component 9 is discharged to cool the inside, and the exit 121 of the heater duct 103 is disposed near the air outlet holes 69 of the heat-generating electric component 9.

In this way, the air-conditioning air discharged from the exit 121 of the heater duct 103 reduces the air pressure in the vicinity of the air outlet holes 69 of the heat-generating electric component 9 to negative pressure, so that the discharged air 133 from the heat-generating electric component 9 is drawn to the exit 121 of the heater duct 103. Thus, the amount of the discharged air 133 is increased. Accordingly, the heat-generating electric component 9 can be cooled efficiently.

(2) The air outlet holes 69 of the heat-generating electric component 9 are formed in the rear surface 67 of the heat-generating electric component 9, and the exit 121 of the heater duct 103 is disposed rearward of the air outlet holes 69 of the heat-generating electric component 9.

In this way, even when the air-conditioning air from the heater duct 103 is temperature adjustment air 129 that is warm, that warm temperature adjustment air 129 can be prevented from directly contacting the heat-generating electric component 9. Also, with the airflow from the heater duct 103 formed rearward of the air outlet holes 69, the heat inside the heat-generating electric component 9 can be prevented from returning again to the inside of the heat-generating electric component 9. Thus, the discharged air 133 from the heat-generating electric component 9 is drawn to the exit 121 of the heater duct 103, thereby increasing the effect of increasing the amount of the discharged air 133.

Note that if the exit 121 of the heater duct 103 is disposed forward of the air outlet holes 69, the discharged air 133 which has been discharged to the outside of the heat-generating electric component 9 may possibly return again to the inside of the heat-generating electric component 9.

(3) The duct is the heater duct 103 through which the temperature adjustment air 129 that is warm is caused to flow.

In this way, the hot discharged air 133 from the heat-generating electric component 9 joins and flows together with the warm temperature adjustment air 129 discharged from the heater duct 103, thereby enhancing the performance of heating inside the cabin.

(4) The seat is the seat 2 of the front seat assembly, and the protector 25 is arranged rearward of the heat-generating electric component 9, and the protector 25 is provided with the extension portion 55, which extends toward the exit 121 of the heater duct 103.

The extension portion 55 can prevents the air-conditioning air from blowing into the heat-generating electric component 9 side after being discharged from the exit 121 of the heater duct 103, which ensures that the air-conditioning air is discharged without being disturbed. Hence, the hot discharged air 133 from the air outlet holes 69 of the heat-generating electric component 9 can be efficiently drawn into the airflow from the heater duct 103 to cool the heat-generating electric component 9.

(5) The heat-generating electric component 9 is disposed above the heater duct 103.

In this way, the heater duct 103 is disposed between the floor surface 5 and the heat-generating electric component 9. Hence, when the seat 2 is sunk downward in the event of a collision of the vehicle or the like, the hollow duct interposed between the floor surface 5 and the heat-generating electric component 9 can absorb part of the energy of the collision and reduce the load to be inputted to the heat-generating electric component 9.

(6) The interior power socket 13 is disposed rearward of and around the air outlet holes 69 of the heat-generating electric component 9, and the exit 121 of the heater duct 103 is disposed below the air outlet holes 69 of the heat-generating electric component 9.

This can reduce the hot discharged air 133 from the heat-generating electric component 9 that contacts the interior power socket 13. Specifically, the air outlet holes 69 of the heat-generating electric component 9 are disposed at substantially the same height level as the interior power socket 13. For this reason, the hot discharged air 133 from the air outlet holes 69 tries to flow to the interior power socket 13. However, the airflow directed rearward from the exit 121 of the heater duct 103 downwardly draws the discharged air 133 from the heat-generating electric component 9 and causes it to flow rearward. This can reduce the hot discharged air 133 that contacts the interior power socket 13, which is disposed rearward of the heat-generating electric component 9, after being discharged from the heat-generating electric component 9.

(7) The heat-generating electric component 9, the housing 37, which surrounds the outer side of the heat-generating electric component 9, and the heater duct 103, which extends from the air conditioning unit 101, are disposed between the seat 2 and the floor surface 5 of the automobile. Moreover, the air outlet holes 89, through which the air on the inside of the housing 37 is discharged outward to cool the inside of the housing 37, are formed in the housing 37, and the exit 121 of the heater duct 103 is disposed near the air outlet holes 89 of the housing 37.

Since the inside of the housing 37 is a closed space, the hot discharged air 133 from the heat-generating electric component 9 stays inside the housing 37. Here, the air-conditioning air discharged from the exit 121 of the heater duct 103 reduces the air pressure near the air outlet holes 89 of the housing 37 to negative pressure. The negative pressure draws the discharged air 133 from the air outlet holes 89 of the housing 37 to the exit 121 of the heater duct 103, thereby increasing the amount of the discharged air 133. Accordingly, the heat-generating electric component 9 can be cooled efficiently.

(8) Inside the attachment member 7, the heater duct 103 is bent to be above the floor surface 5, and the exit 121 of the heater duct 103 is therefore disposed above the floor surface 5. This can reduce dust, dirt, and the like on the floor surface 5 blown up by the airflow from the exit 121 of the heater duct 103. Moreover, a space to dispose other members can be left under the heater duct 103. Hence, the internal space of the attachment member 7 can be effectively utilized.

Note that the present invention is not limited to the embodiments described above, and various changes and modifications can be made. For example, while the housing 37, which surrounds the heat-generating electric component 9, is provided in one or more of the above embodiments, this housing 37 may be omitted. Also, while one or more of the above embodiments has been described by taking the seat 2 of the driver seat assembly 1, which is a front seat assembly, as an example, the attachment member 7 and other parts may be provided, for example, under the seat of a middle seat assembly in the front-rear direction among three rows of seat assemblies aligned side by side in the front-rear direction. Further, instead of the heater duct 103, a duct through which normal air-conditioning air is caused to flow may be employed.

According to the structure for arranging a heat-generating electric component in an automobile according to one or more embodiments of the present invention, the air-conditioning air discharged from the exit of the duct reduces the air pressure near the air outlet holes of the heat-generating electric component to negative pressure, thereby drawing the discharged air from the heat-generating electric component to the exit of the duct. Thus, the amount of the discharged air from the heat-generating electric component is increased. Accordingly, the heat-generating electric component can be cooled efficiently.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 2 seat
5 floor surface
9 heat-generating electric component
55 extension portion
67 rear surface
69 air outlet hole
101 air conditioning unit
103 heater duct (duct)
121 exit
129 temperature adjustment air

The invention claimed is:

1. A structure for arranging a heat-generating electric component in an automobile, comprising:
   a heat-generating electric component; and
   a duct extending from an air conditioning unit,
   wherein the heat-generating electric component and the duct are disposed between a seat and a floor surface of the automobile,
   wherein an air outlet hole is formed in the heat-generating electric component, through which air on an inside of the heat-generating electric component is discharged to cool the inside,
   wherein an exit of the duct is disposed near the air outlet hole of the heat-generating electric component,
   wherein the air outlet hole of the heat-generating electric component is formed in a rear surface of the heat-generating electric component in a longitudinal direction of the automobile,
   wherein the exit of the duct is disposed rearward of the air outlet hole of the heat-generating electric component in the longitudinal direction of the automobile
   wherein a protector is arranged rearward of the heat-generating electric component,
   wherein the protector is formed in an angular U-shape in a side view, and
   wherein the protector is formed by:
      a vertical surface disposed in the vertical direction;
      an upper flange bent and extending forward from the upper end of the vertical surface; and
      an extension portion bent and extending toward the exit of the duct from the lower end of the vertical surface.

2. The structure for arranging the heat-generating electric component in the automobile according to claim 1, wherein the duct is a heater duct through which temperature adjustment air that is warm is caused to flow.

3. The structure for arranging the heat-generating electric component in the automobile according to claim 2,
   wherein the seat is of a front seat assembly.

4. The structure for arranging the heat-generating electric component in the automobile according to claim 2, wherein the heat-generating electric component is disposed above the duct.

5. The structure for arranging the heat-generating electric component in the automobile according to claim 2,
   wherein an interior power socket is disposed rearward of and around the air outlet hole of the heat-generating electric component, and
   wherein the exit of the duct is disposed below the air outlet hole of the heat-generating electric component.

6. The structure for arranging the heat-generating electric component in the automobile according to claim 1,
   wherein the seat is of a front seat assembly.

7. The structure for arranging the heat-generating electric component in the automobile according to claim 6, wherein the heat-generating electric component is disposed above the duct.

8. The structure for arranging the heat-generating electric component in the automobile according to claim 6,
   wherein an interior power socket is disposed rearward of and around the air outlet hole of the heat-generating electric component, and
   wherein the exit of the duct is disposed below the air outlet hole of the heat-generating electric component.

9. The structure for arranging the heat-generating electric component in the automobile according to claim 1,
   wherein an interior power socket is disposed rearward of and around the air outlet hole of the heat-generating electric component, and
   wherein the exit of the duct is disposed below the air outlet hole of the heat-generating electric component.

10. The structure for arranging the heat-generating electric component in the automobile according to claim 1, wherein the heat-generating electric component is disposed above the duct in a vertical direction of the automobile.

11. A structure for arranging a heat-generating electric component in an automobile, comprising:
    a heat-generating electric component;
    a housing surrounding an outer side of the heat-generating electric component; and
    a duct extending from an air conditioning unit,
    wherein the heat-generating electric component, the housing, and the duct are disposed between a seat and a floor surface of the automobile,
    wherein an air outlet hole is formed in the housing, through which air on an inside of the housing is discharged outward to cool the inside of the housing,
    wherein an exit of the duct is disposed near the air outlet hole of the housing, and
    wherein the air outlet hole of the housing is formed in a rear surface of the housing in a longitudinal direction of the automobile,
    wherein the exit of the duct is disposed rearward of the air outlet hole of the housing in the longitudinal direction of the automobile,
    wherein a protector is arranged rearward of the heat-generating electric component,
    wherein the protector is formed in an angular U-shape in a side view, and
    wherein the protector is formed by:
       a vertical surface disposed in the vertical direction;
       an upper flange bent and extending forward from the upper end of the vertical surface; and an extension portion bent and extending toward the exit of the duct from the lower end of the vertical surface.

12. The structure for arranging the heat-generating electric component in the automobile according to claim 11, wherein the duct is a heater duct through which temperature adjustment air that is warm is caused to flow.

13. The structure for arranging the heat-generating electric component in the automobile according to claim 11, wherein the seat is of a front seat assembly.

14. The structure for arranging the heat-generating electric component in the automobile according to claim 11, wherein the heat-generating electric component is disposed above the duct.

15. The structure for arranging the heat-generating electric component in the automobile according to claim 11,
   wherein an interior power socket is disposed rearward of and around the air outlet hole of the heat-generating electric component, and
   wherein the exit of the duct is disposed below the air outlet hole of the heat-generating electric component.

* * * * *